(12) United States Patent
Seo et al.

(10) Patent No.: US 11,307,618 B2
(45) Date of Patent: Apr. 19, 2022

(54) ELECTRONIC DEVICE FOR DISPLAYING INFORMATION REGARDING STYLUS PEN AND METHOD THEREOF

(71) Applicant: Samsung Electronics Co., Ltd., Suwon-si (KR)

(72) Inventors: Chaewon Seo, Suwon-si (KR); Zion Kwon, Suwon-si (KR); Heewoon Kim, Suwon-si (KR); Hyunmi Park, Suwon-si (KR); Hyewon Park, Suwon-si (KR); Hyungdo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 16/533,023

(22) Filed: Aug. 6, 2019

(65) Prior Publication Data

US 2020/0050242 A1    Feb. 13, 2020

(30) Foreign Application Priority Data

Aug. 8, 2018    (KR) .................. 10-2018-0092161

(51) Int. Cl.
*G06F 1/16* (2006.01)
*H04W 4/80* (2018.01)
(Continued)

(52) U.S. Cl.
CPC ........ *G06F 1/1656* (2013.01); *G06F 3/03545* (2013.01); *G06F 3/0484* (2013.01); *H04W 4/80* (2018.02)

(58) Field of Classification Search
CPC ................ G06F 1/1626; G06F 1/1656; G06F 2200/1632; G06F 2203/0384;
(Continued)

(56) References Cited

U.S. PATENT DOCUMENTS 10,846,076 B2 * 11/2020 Wingate, Jr. ............. G06F 8/61
2014/0028617 A1    1/2014 Kim et al.
(Continued)

FOREIGN PATENT DOCUMENTS

EP    2 778 834 A1    9/2014
JP    2013-239009 A    11/2013
(Continued)

OTHER PUBLICATIONS

International Search Report dated Jan. 28, 2019, issued in an International Application No. PCT/KR2019/009772.
(Continued)

*Primary Examiner* — Kenneth Bukowski
(74) *Attorney, Agent, or Firm* — Jefferson IP Law, LLP

(57) ABSTRACT

An electronic device for displaying information related to a stylus pen is provided. The electronic device includes a wireless communication link, which is based on a short-range wireless communication protocol, with a stylus pen inserted into an inner space of a housing, detects that the stylus pen is detached from the housing, receives a signal including information about a battery state of the stylus pen from the stylus pen through the short-range wireless communication protocol, and displays a first graphical user interface (GUI) indicating the battery state, based at least on the information about the battery state.

14 Claims, 13 Drawing Sheets

(51) Int. Cl.
*G06F 3/0484* (2022.01)
*G06F 3/0354* (2013.01)

(58) Field of Classification Search
CPC .............. G06F 3/03545; G06F 3/0383; G06F 3/04817; G06F 3/0484; H04W 4/027; H04W 4/80
See application file for complete search history.

(56) References Cited

U.S. PATENT DOCUMENTS

| | | | |
|---|---|---|---|
| 2014/0253464 A1* | 9/2014 | Hicks | G06F 3/0488 345/173 |
| 2014/0292730 A1 | 10/2014 | Yoon et al. | |
| 2015/0370352 A1 | 12/2015 | Michihata et al. | |
| 2016/0299585 A1* | 10/2016 | Lee | G06F 3/03545 |
| 2017/0064754 A1* | 3/2017 | Choi | H04W 4/80 |
| 2017/0115755 A1* | 4/2017 | Jung | A61B 5/0205 |
| 2017/0322642 A1 | 11/2017 | Zhang et al. | |
| 2018/0046269 A1 | 2/2018 | Kaplan | |
| 2018/0173330 A1 | 6/2018 | Lee et al. | |
| 2020/0125190 A1 | 4/2020 | Jung et al. | |

FOREIGN PATENT DOCUMENTS

| | | |
|---|---|---|
| KR | 10-1221895 B1 | 1/2013 |
| KR | 10-1233215 B1 | 2/2013 |
| KR | 10-2014-0014796 A | 2/2014 |
| KR | 10-2016-0016278 A | 2/2016 |
| KR | 10-2016-0035535 A | 3/2016 |
| KR | 10-2016-0047385 A | 5/2016 |

OTHER PUBLICATIONS

Extended European Search Report dated Jun. 4, 2021; European Appln. No. 19847421.5-1216 / 3791254 PCT/KR2019009772.

* cited by examiner

ELECTRONIC DEVICE FOR DISPLAYING INFORMATION REGARDING STYLUS PEN AND METHOD THEREOF

CROSS-REFERENCE TO RELATED APPLICATION(S)

This application is based on and claims priority under 35 U.S.C. § 119 of a Korean patent application number 10-2018-0092161, filed on Aug. 8, 2018, in the Korean Intellectual Property Office, the disclosure of which is incorporated by reference herein in its entirety.

BACKGROUND

1. Field

The disclosure relates to an electronic device for displaying information about a stylus pen and a method thereof.

2. Description of Related Art

An electronic device may include a stylus pen that is capable of being inserted into the electronic device or being detached from the electronic device. The stylus pen may provide an environment where a user inputs handwriting on a display of the electronic device.

Because the stylus pen may interact with the electronic device based on an electromagnetic induction manner or a short-range wireless communication protocol, the stylus pen may provide various user experience (UX) environments to the user. Also, based on the short-range wireless communication protocol, the electronic device may interact with a plurality of stylus pens as well as a single stylus pen.

The above information is presented as background information only to assist with an understanding of the disclosure. No determination has been made, and no assertion is made, as to whether any of the above might be applicable as prior art with regard to the disclosure.

SUMMARY

For a seamless wireless communication between an electronic device and a stylus pen, it is necessary to monitor a battery state of the stylus pen or a connected state of the wireless communication periodically. Also, for the user to identify a stylus pen connected with the electronic device based on the short-range wireless communication protocol from among a plurality of stylus pens, it is necessary to feed information about the stylus pen connected with the electronic device back to the user.

Because the stylus pen does not include a separate display in consideration of a mounting space and power consumption, there is a limitation in providing information about a battery state or a connected state of the wireless communication to the user.

Aspects of the disclosure are to address at least the above-mentioned problems and/or disadvantages and to provide at least the advantages described below. Accordingly, an aspect of the disclosure is to provide a device and a method for monitoring information about a stylus pen and displaying the monitored information.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a display that is viewable through a portion of the housing, a wireless communication circuit that is disposed within the housing, at least one processor that is disposed within the housing and is operatively connected with the display and the wireless communication circuit, and a memory that is disposed within the housing and is operatively connected with the processor. The memory may store instructions that, when executed, configure the at least one processor to establish a wireless communication link, which is based on a short-range wireless communication protocol, with a stylus pen inserted into an inner space of the housing, through the wireless communication circuit, to receive a signal including information about a battery state of the stylus pen from the stylus pen, through the wireless communication circuit and the short-range wireless communication protocol, to detect that the stylus pen is detached from the housing, and to display a first graphical user interface (GUI) indicating the battery state through the display, based at least on the information about the battery state.

In accordance with another aspect of the disclosure, a method of an electronic device is provided. The method includes establishing a wireless communication link, which is based on a short-range wireless communication protocol, with a stylus pen inserted into an inner space of the electronic device, receiving a signal including information about a battery state of the stylus pen from the stylus pen, through the short-range wireless communication protocol, detecting that the stylus pen is detached from a housing of the electronic device, and displaying a first graphical user interface (GUI) indicating the battery state, based at least on the information about the battery state.

In accordance with another aspect of the disclosure, an electronic device is provided. The device includes a housing, a display that is viewable through a portion of the housing, a wireless communication circuit that is disposed within the housing, a stylus pen that is insertable into an inner space of the housing, at least one processor that is disposed within the housing and is operatively connected with the display and the wireless communication circuit, and a memory that is disposed within the housing and is operatively connected with the processor. The memory may store instructions that, when executed, configure the at least one processor to establish a wireless communication link, which is based on a short-range wireless communication protocol, with the stylus pen inserted into the inner space of the housing, through the wireless communication circuit, to detect that the stylus pen is detached from the housing, to receive a signal including information about a battery state of the stylus pen from the stylus pen, through the wireless communication circuit and the short-range wireless communication protocol, and to display a first graphical user interface indicating the battery state through the display, based at least on the information about the battery state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
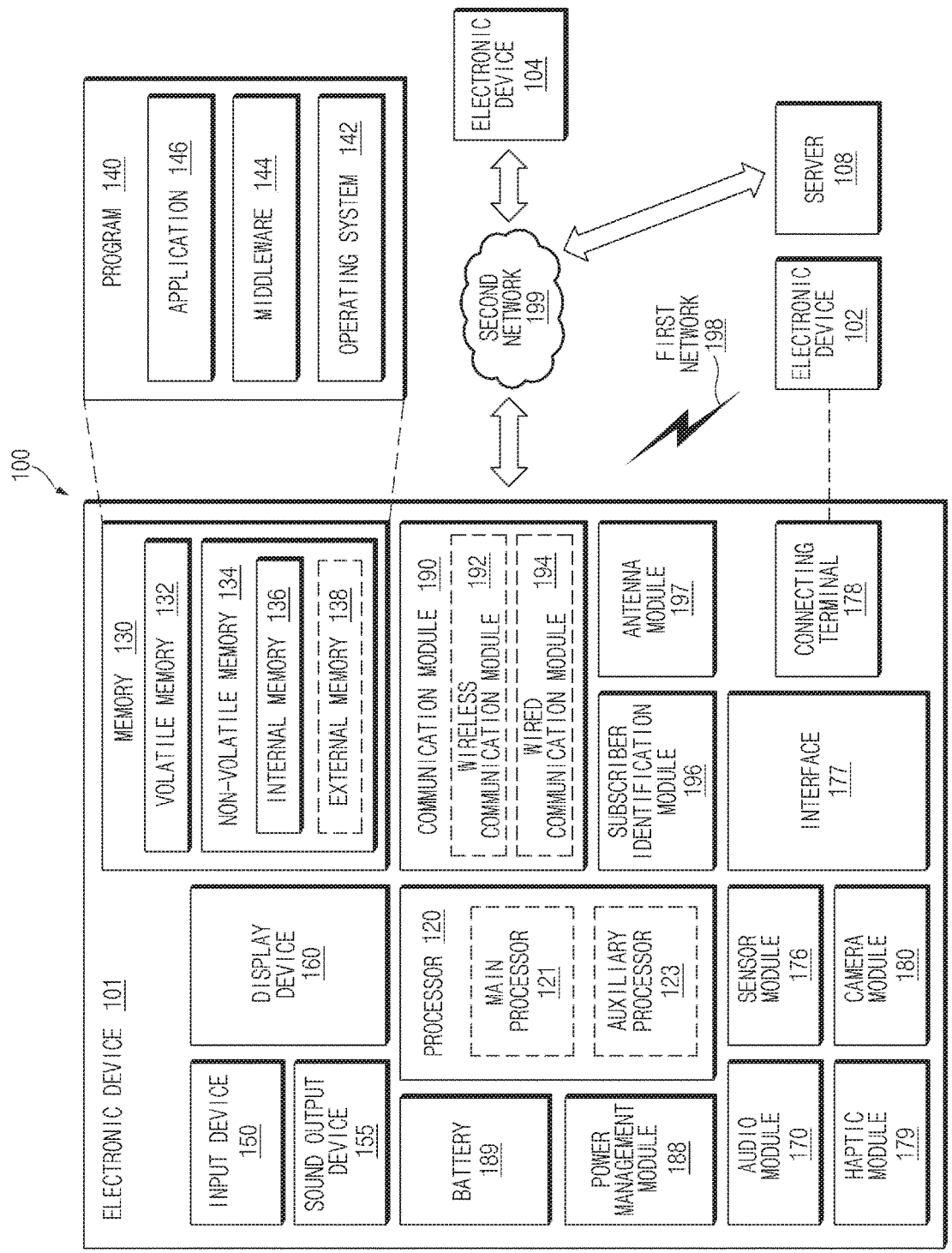
FIG. 1 is a block diagram of an electronic device in a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth (BT), wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
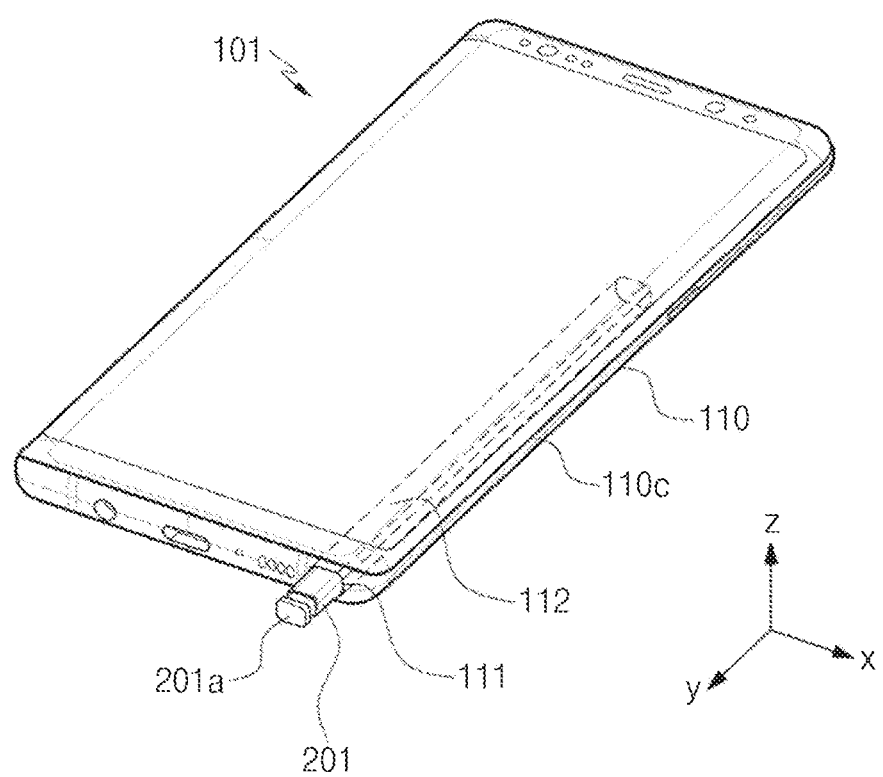
FIG. 2 is a perspective view of an electronic device including a digital pen according to various embodiments of the disclosure.

FIG. 2 is a perspective view of the electronic device 101 including a digital pen 201 according to various embodiments of the disclosure.

Referring to FIG. 2, the electronic device 101 of an embodiment may include the configuration illustrated in FIG. 1, and may include a structure in which the digital pen 201 (e.g., a stylus pen) may be inserted. The electronic device 101 may include a housing 110 and may include a hole 111 in one portion of the housing 110, for example, a portion of a side surface 110C of the housing 110. According to an embodiment, the electronic device 101 may include a receiving space 112 connected with the hole 111, and the digital pen 201 may be inserted into the receiving space 112. According to various embodiments illustrated, the digital pen 201 may include a button 201a, which is capable of being pressed, at one end portion thereof such that the digital pen 201 is easily pulled out from the receiving space 112 of the electronic device 101. When the button 201a is pressed, a repulsion mechanism (e.g., at least one spring) that is configured to link to the button 201a acts, and the digital pen 201 may be detached from the receiving space 112.

Figure 3:
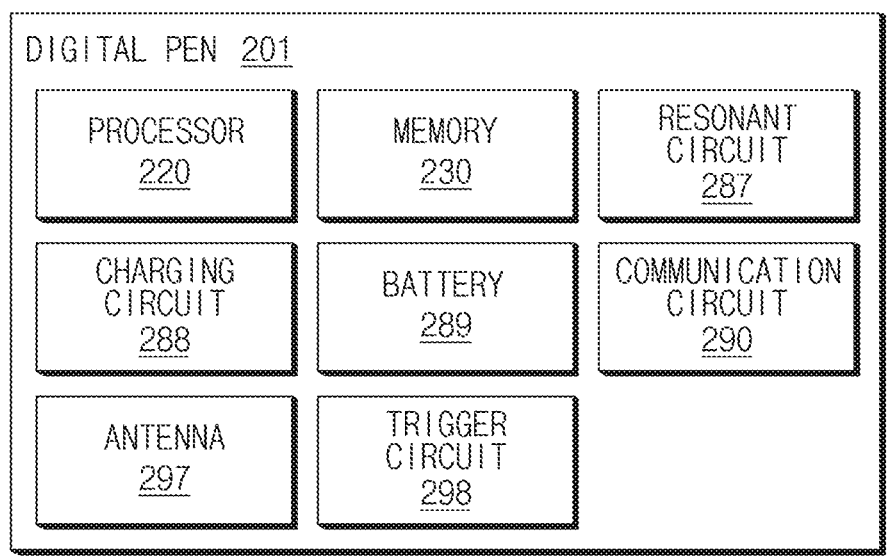
FIG. 3 illustrates a block diagram of a digital pen according to various embodiments of the disclosure.

FIG. 3 illustrates a block diagram of the digital pen 201 according to various embodiments of the disclosure.

Referring to FIG. 3, the digital pen 201 according to an embodiment may include a processor 220, a memory 230, a resonant circuit 287, a charging circuit 288, a battery 289, a communication circuit 290, an antenna 297, and/or a trigger circuit 298. In some embodiments, in the digital pen 201, the processor 220, at least a part of the resonant circuit 287, and/or at least a part of the communication circuit 290 may be implemented on a printed circuit board (PCB) or may be implemented in the form of a chip. The processor 220, the resonant circuit 287, and/or the communication circuit 290 may be electrically connected with the memory 230, the charging circuit 288, the battery 289, the antenna 297, or the trigger circuit 298. The digital pen 201 according to an embodiment may be implemented only with a resonant circuit and a button.

According to an embodiment, the processor 220 may include a customized hardware module or a generic processor configured to execute software (e.g., an application program). The processor 220 may include a hardware component (function) or a software component (program) including at least one of the following included in the digital pen 201: various sensors, a data measurement module, an input/output interface, a module to manage a state or an environment of the digital pen 201, or a communication module. The processor 220 may include one of hardware, software, or firmware or a combination of two or more thereof. According to an embodiment, the processor 220 may receive a proximity signal corresponding to an electromagnetic signal that is generated from a digitizer (e.g., at least a part of the display device 160) of the electronic device 101 through the resonant circuit 287. When the proximity signal is identified, the processor 220 may control the resonant circuit 287 such that an electro-magnetic resonance (EMR) input signal is transmitted to the electronic device 101.

According to an embodiment, the memory 230 may store information about an operation of the digital pen 201. For example, the information may include information for a communication with the electronic device 101 and frequency information about an input operation of the digital pen 201.

According to an embodiment, the resonant circuit 287 may include at least one of a coil, an inductor, or a capacitor. The resonant circuit 287 may be used for the digital pen 201 to generate a signal including a resonant frequency. For example, to generate a signal, the digital pen 201 may use at least one of an electro-magnetic resonance (EMR) manner, an active electrostatic (AES) manner, or an electrically coupled resonance (ECR) manner. In the case where the digital pen 201 transmits a signal in the EMR manner, the digital pen 201 may generate a signal including a resonant frequency, based on an electromagnetic field generated from an inductive panel of the electronic device 101. In the case where the digital pen 201 transmits a signal in the AES manner, the digital pen 201 may generate a signal by using the capacity coupling with the electronic device 101. In the case where the digital pen 201 transmits a signal in the ECR manner, the digital pen 201 may generate a signal including a resonant frequency, based on an electric field generated from a capacitive device of the electronic device 101. According to an embodiment, the resonant circuit 287 may be used to change the intensity of electromagnetic field or a frequency depending on a manipulating state of the user. For example, the resonant circuit 287 may provide a frequency for recognizing a hovering input, a drawing input, a button input, or an erasing input.

According to an embodiment, when the charging circuit 288 is connected with the resonant circuit 287 based on a switching circuit, the charging circuit 288 may rectify a resonance signal generated from the resonant circuit 287 to a direct current signal so as to be supplied to the battery 289. According to an embodiment, the digital pen 201 may determine whether the digital pen 201 is inserted into the electronic device 101, by using a voltage level of the direct current signal detected from the charging circuit 288.

According to an embodiment, the battery 289 may store energy necessary for an operation of the digital pen 201. For example, the battery 289 may include a lithium-ion battery or a capacitor and may be rechargeable or exchangeable. According to an embodiment, the battery 289 may be charged by using a power (e.g., a direct current signal (or a direct current power)) provided from the charging circuit 288.

According to an embodiment, the communication circuit 290 may be configured to perform a wireless communication function between the digital pen 201 and the communication module 190 of the electronic device 101. According to an embodiment, the communication circuit 290 may transmit state information and input information of the digital pen 201 to the electronic device 101 by using a short-range communication manner. For example, the communication circuit 290 may transmit direction information (e.g., motion sensor data) of the digital pen 201 obtained through the trigger circuit 298, voice information input through a microphone, or level information of the battery 289. For example, the short-range communication manner may include at least one of Bluetooth low energy (BLE) or wireless LAN.

According to an embodiment, the antenna 297 may be used to transmit a signal or a power to the outside (e.g., the electronic device 101) or to receive a signal or a power from the outside. According to an embodiment, the digital pen 201 may include a plurality of antennas 297 and may select at least one antenna 297 appropriate for a communication manner from among the plurality of antennas 297. The communication circuit 290 may exchange a signal or a power with an external electronic device through the at least one antenna 297 thus selected.

According to an embodiment, the trigger circuit 298 may include at least one button or sensor circuit. According to an embodiment, the processor 220 may identify an input manner (e.g., touching or a pressing) or a kind (e.g., an EMR button or a BLE button) of a button of the digital pen 201. According to an embodiment, the sensor circuit may generate an electrical signal or a data value that corresponds to an internal operation state of the digital pen 201 or corresponds to an external environment state. For example, the sensor circuit may include at least one of a motion sensor, a battery level detection sensor, a pressure sensor, a light sensor, a temperature sensor, a geomagnetic sensor, or a biometric sensor. According to an embodiment, the trigger circuit 298 may transmit a trigger signal to the electronic device 101 by using an input signal of a button or a signal through a sensor.

Figure 4:
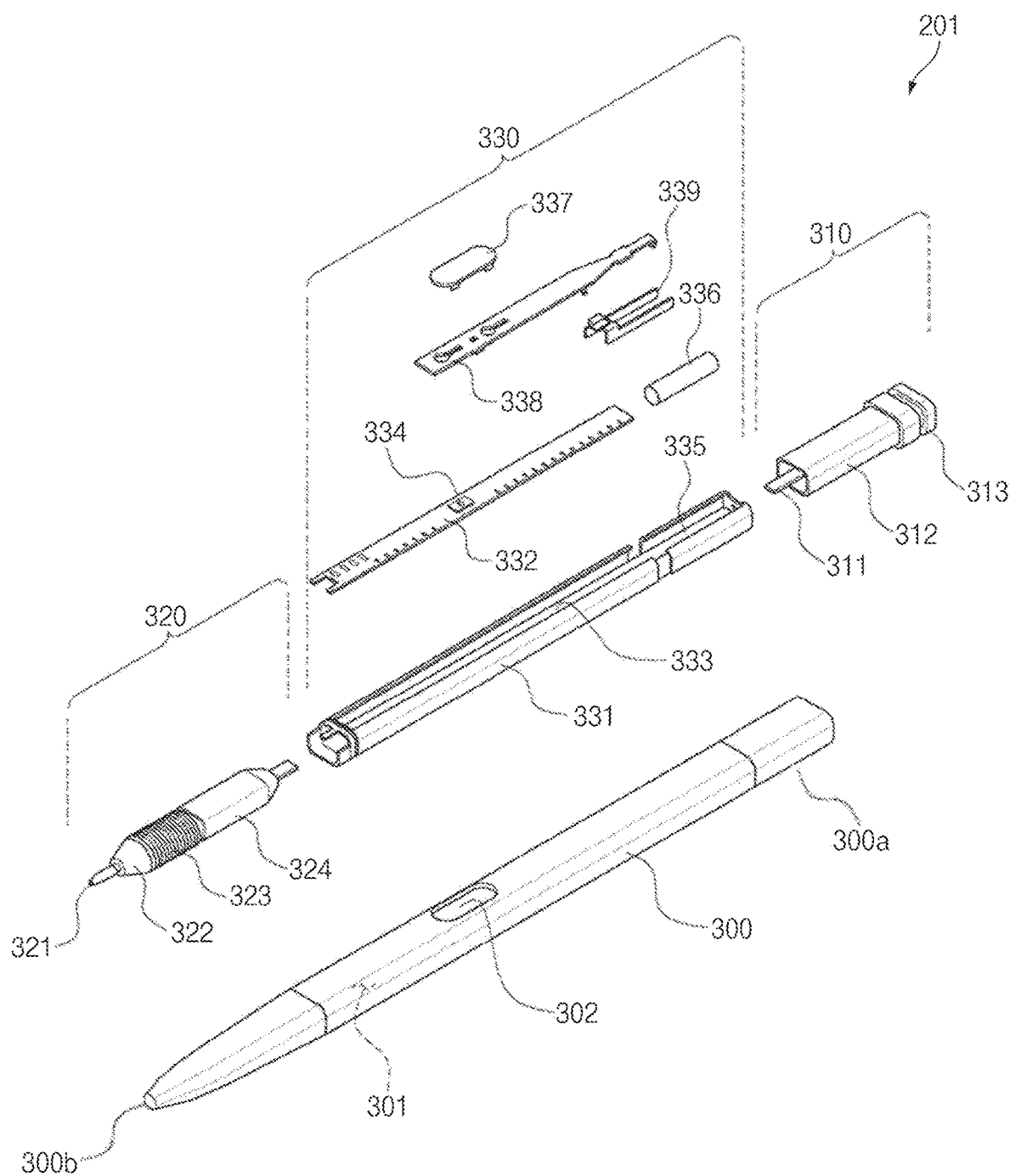
FIG. 4 is an exploded perspective view of a digital pen according to various embodiments of the disclosure.

FIG. 4 is an exploded perspective view of the digital pen 201 according to various embodiments of the disclosure.

Referring to FIG. 4, the digital pen 201 may include a pen housing 300 forming the exterior of the digital pen 201 and an inner assembly in the pen housing 300. In an embodiment illustrated, the inner assembly may include all the parts mounted within a pen and may be inserted into the pen housing 300 by only one assembly operation.

According to an embodiment, the pen housing 300 may be elongated between a first end portion 300a and a second end portion 300b and may include the receiving space 301 therein. The pen housing 300 may have the shape of an ellipse, the cross section of which includes a short axis and a long axis and may be formed in the shape of an elliptic cylinder on the whole. A receiving space of the digital pen 201 may have an elliptic cross section corresponding to the shape of the pen housing 300. The pen housing 300 may include a synthetic resin (e.g., plastic) and/or a metallic material (e.g., aluminum). According to an embodiment, the second end portion 300b of the pen housing 300 may be formed of a synthetic resin material.

According to an embodiment, the inner assembly may have an elongated shape corresponding to the shape of the pen housing 300. The inner assembly may be roughly divided into three components along a longitudinal direction. For example, the inner assembly may include an ejection member 310 disposed at a location corresponding to the first end portion 300a of the pen housing 300, a coil part 320 disposed at a location corresponding to the second end portion 300b of the pen housing 300, and a circuit board part 330 disposed at a location corresponding to a body of a housing.

According to an embodiment, the ejection member 310 may include a component for pulling out the digital pen 201 from the receiving space 112 of the electronic device 101. According to an embodiment, the ejection member 310 may include a shaft 311, and an ejection body 312 and a button part 313 disposed around the shaft 311 and forming the overall exterior of the ejection member 310. When the inner assembly is completely inserted into the pen housing 300, the part of the ejection member 310, which includes the shaft 311 and the ejection body 312, may be surrounded by the first end portion 300a of the pen housing 300, and the button part 313 (e.g., 201a of FIG. 2) may be exposed to the outside of the first end portion 300a. A plurality of components (not illustrated), for example, cam members or elastic members may be disposed in the ejection body 312 to form a push-pull structure. In an embodiment, the button part 313 may be substantially engaged with the shaft 311 to reciprocate linearly with respect to the ejection body 312. According to various embodiments, the button part 313 may include a button having a stopper structure that allows the user to pull out the digital pen 201 by using his/her nail. According to an embodiment, the digital pen 201 may include a sensor detecting a linear reciprocating motion of the shaft 311, thus providing another input manner.

According to an embodiment, the coil part 320 may include a pen tip 321 exposed to the outside of the second end portion 300b when the inner assembly is inserted into the pen housing 300, a packing ring 322, a coil 323 having a plurality of turns, and/or a pen pressure sensing unit 324 for obtaining a change in pressure when the pen tip 321 is pressed. The packing ring 322 may include epoxy, rubber, urethane, or silicon. The packing ring 322 may be provided for the purpose of waterproofing and dustproofing and may protect the coil part 320 and the circuit board part 330 from moisture when the electronic device 101 and/or the digital pen 201 are infiltrated into water or from dust. According to an embodiment, the coil 323 may form a resonant frequency in a given frequency band (e.g., 500 kHz), and may be combined with at least one element (e.g., a capacitor) to adjust the resonant frequency formed by the coil 323 within a given range.

According to an embodiment, the circuit board part 330 may include a printed circuit board 332, a base 331 covering at least one surface of the printed circuit board 332, and an antenna. According to an embodiment, a substrate seating part 333, on which the printed circuit board 332 is disposed, may be formed on an upper surface of the base 331, and the printed circuit board 332 may be fixed in the state of being seated on the substrate seating part 333. According to an embodiment, the printed circuit board 332 may include an upper surface and a lower surface. A variable capacitor connected with the coil 323 or a switch 334 may be disposed on the upper surface, and a charging circuitry, a battery, or a communication circuitry may be disposed on the lower surface. The battery may include an electric double layered capacitor (EDLC). The charging circuitry is interposed between the coil 323 and the battery and may include a voltage detector circuitry and a rectifier.

According to an embodiment, the antenna may include an antenna structure 339 that is exemplified as illustrated in FIG. 4 and/or an antenna that is embedded in the printed circuit board 332. According to various embodiments, the switch 334 may be provided on the printed circuit board 332. A side button 337 that is provided on the digital pen 201 may be used to press the switch 334 and may be exposed to the outside through a side opening 302 of the pen housing 300. The side button 337 may be supported by a supporting member 338. When there is no external force acting on the side button 337, the supporting member 338 may provide restoring force such that the side button 337 is returned to or maintained at a specific location.

According to an embodiment, the circuit board part 330 may include a different packing ring such as an O-ring. For example, O-rings that are formed of an elastic material may be disposed at opposite ends of the base 331 to form a sealing structure between the base 331 and the pen housing 300. In any embodiment, the supporting member 338 may be partially in close contact with an inner wall of the pen housing 300 around the side opening 302 to form a sealing structure. For example, as in the packing ring 322 of the coil part 320, the circuit board part 330 may have a waterproof and dustproof structure.

According to an embodiment, the digital pen 201 may include a battery mounting part (not illustrated) provided on the upper surface of the base 331 such that a battery 336 is disposed in the battery mounting part 335. The battery 336 that is able to be mounted on the battery mounting part 335 may include, for example, a cylinder-type battery.

According to an embodiment, the digital pen 201 may include a microphone (not illustrated). The microphone may be directly connected with the printed circuit board 332 or may be connected with a separate flexible printed circuit board (FPCB) (not illustrated) connected with the printed circuit board 332. According to various embodiments, the microphone may be disposed parallel to the side button 337 in the longitudinal direction of the digital pen 201.

Figure 5:
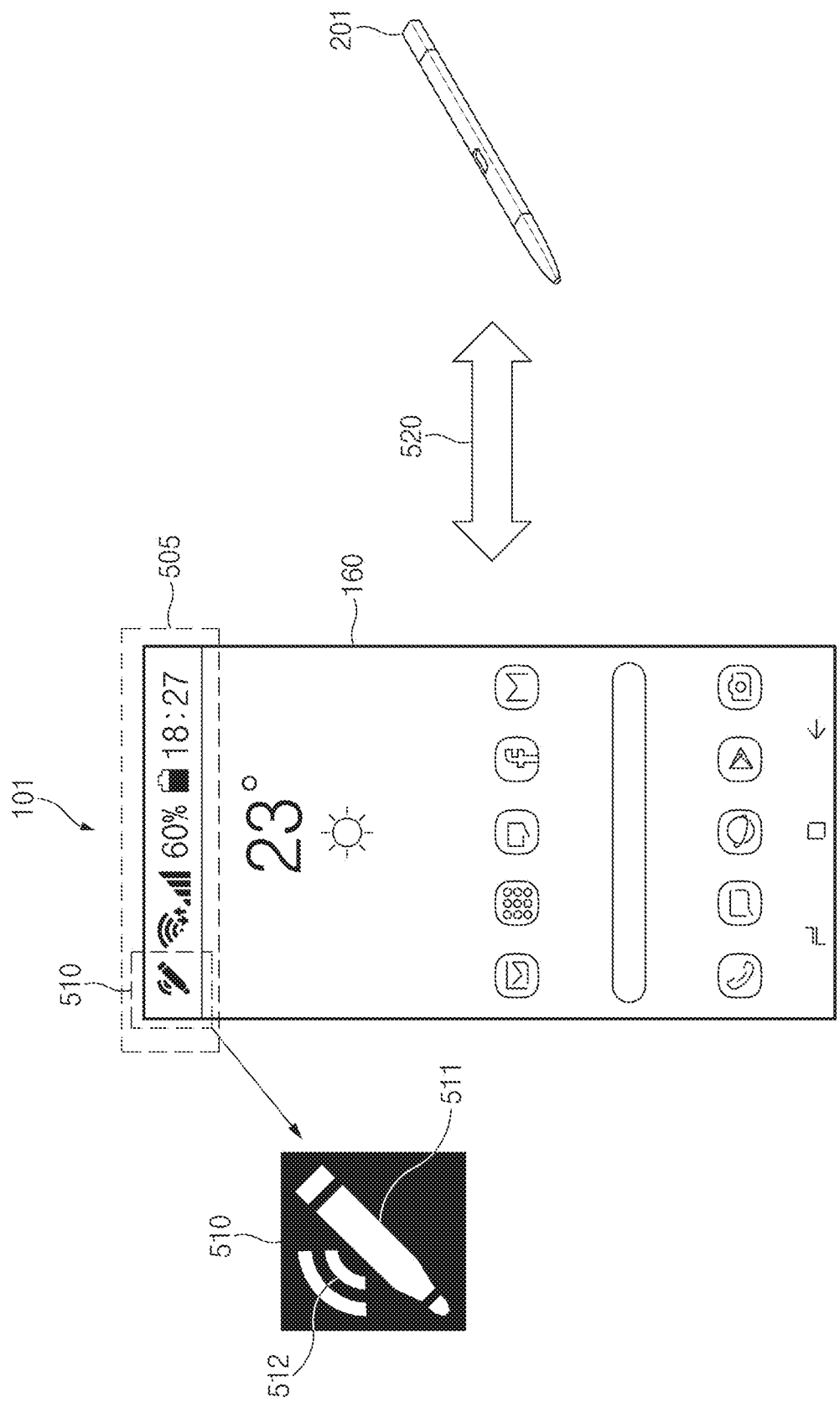
FIG. 5 illustrates a graphical user interface (GUI) indicating information about a digital pen according to various embodiments of the disclosure.

FIG. 5 illustrates a graphical user interface (GUI) 510 indicating information about a digital pen according to various embodiments of the disclosure.

Referring to FIG. 5, the electronic device 101 may establish a wireless communication link 520 with the digital pen 201 (e.g., a stylus pen) based on the short-range wireless communication protocol. For example, the short-range wireless communication protocol may be based on the Bluetooth standard or the Bluetooth low energy (BLE) standard defined by the Bluetooth special interest group (SIG).

According to an embodiment, to feed back a status of the wireless communication link 520 or a battery state of the digital pen 201 to the user without stopping, the electronic device 101 may display a graphical user interface (GUI) 510 indicating information about the digital pen 201 through the display 160 (e.g., at least a part of the display 160) in a state where the wireless communication link 520 is established. According to an embodiment, for example, the GUI 510 may include at least one of a first GUI 511 indicating a remaining quantity (or level) state of a battery (e.g., the battery 289 of FIG. 2) of the digital pen 201 or a second GUI 512 indicating a connected state of the wireless communication link 520.

According to an embodiment, although not illustrated in FIG. 5, when there are a plurality of digital pens each having a history in which the connection with the electronic device 101 is made based on the short-range wireless communication protocol, the information about the digital pen 201 may include at least one of information indicating that there are a plurality of digital pens each having a history in which the connection with the electronic device 101 is made or color information of a digital pen (e.g., 201) currently establishing the wireless communication link 520 with the electronic device 101 from among the plurality of digital pens.

According to an embodiment, the electronic device 101 may display the GUI 510 in a partial area of an indicator bar 505 located in one area (e.g., an upper end) of the display 160. According to an embodiment, the indicator bar 505 may indicate states of the electronic device 101, for example, at least one of a battery remaining quantity state, a cellular communication connection state, a wireless-fidelity (Wi-Fi) connection state, or a current time.

According to an embodiment, the electronic device 101 may display the GUI 510 in response to detecting that the digital pen 201 is detached from the electronic device 101. How to detect that the digital pen 201 is detached from the electronic device 101 will be described with reference to an embodiment illustrated in FIG. 10.

Figure 6:
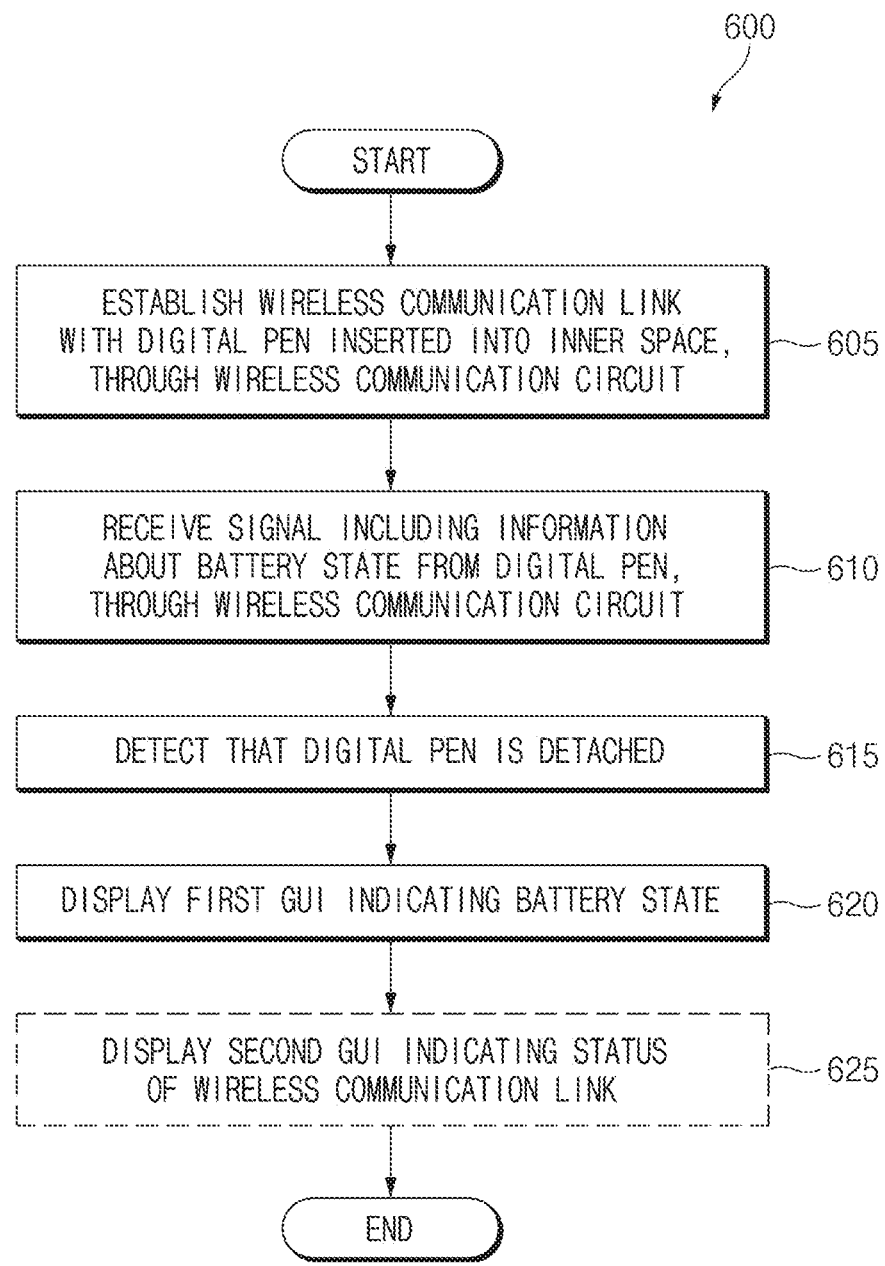
FIG. 6 illustrates an operation flowchart of an electronic device displaying a GUI associated with a digital pen according to various embodiments of the disclosure.

FIG. 6 illustrates an operation flowchart 600 of the electronic device 101 displaying a GUI (e.g., at least one of 511 or 512) associated with a digital pen according to various embodiments of the disclosure.

Operations that are illustrated in FIG. 6 or another operation flowchart may be performed by the electronic device 101 or a component of the electronic device 101. For example, the component of the electronic device 101 may include at least one of a hardware component (e.g., the processor 120) or a software component (e.g., an application layer 146 or a middleware 144) among the components illustrated in FIG. 1.

Referring to FIG. 6, in operation 605 of the flowchart 600, the electronic device 101 may establish the wireless communication link 520 with the digital pen 201 inserted into an inner space (e.g., the receiving space 112 of FIG. 2), through a wireless communication circuit (e.g., at least a part of the wireless communication module 192 of FIG. 1). According to an embodiment, the wireless communication link 520 may be based on at least one of the Bluetooth standard or the BLE standard.

In operation 610, the electronic device 101 may receive a signal including information about a battery state of the digital pen 201 from the digital pen 201, through the wireless communication circuit and the wireless communication link 520. The information about the battery state may include, for example, a battery level (or percentage). According to an embodiment, the electronic device 101 may store the information about the battery state in a memory (e.g., the memory 130 of FIG. 1).

In operation 615, the electronic device 101 may detect that the digital pen 201 is detached from the inner space of the electronic device 101. For example, the electronic device

101 may detect the detachment of the digital pen 201 by using the electromagnetic induction manner (e.g., at least one of EMR, AES, or ECR).

In operation 620, the electronic device 101 may display the first GUI 511 indicating the battery state of the digital pen 201 through a display in response to detecting the detachment of the digital pen 201.

In operation 625, the electronic device 101 may display the second GUI 512 indicating a connected state of the wireless communication link 520 through the display. According to an embodiment, the electronic device 101 may omit operation 625 and may display only the first GUI 511.

Figure 7:
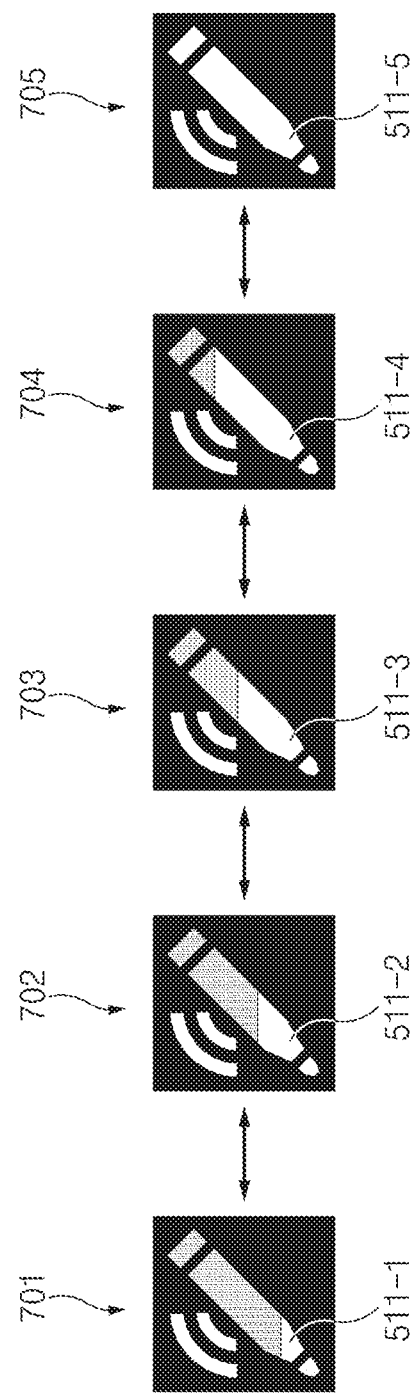
FIG. 7 illustrates a first GUI indicating a battery state in phases according to various embodiments of the disclosure.

FIG. 7 illustrates the first GUI 511 indicating a battery state in phases according to various embodiments of the disclosure.

Referring to FIG. 7, the electronic device 101 may display the first GUI 511 in phases depending on a battery level (or percentage) of the digital pen 201. For example, a remaining quantity of a battery may be classified into a first state 701 indicating smaller than 20%, a second state 702 indicating 20% or more and smaller than 40%, a third state 703 indicating 40% or more and smaller than 60%, a fourth state 704 indicating 60% or more and smaller than 80%, and a fifth state 705 indicating 80% or more.

According to an embodiment, in the first state 701, the electronic device 101 may display a first GUI 511-1 in which an area occupying 20% of a GUI indicating the shape of the digital pen 201 is displayed to have a color and an area occupying 80% is transparently displayed. In the second state 702, the electronic device 101 may display a first GUI 511-2 in which an area occupying 40% of the GUI indicating the shape of the digital pen 201 is displayed to have a color and an area occupying 60% is transparently displayed. In the third state 703, the electronic device 101 may display a first GUI 511-3 in which an area occupying 50% of the GUI indicating the shape of the digital pen 201 is displayed to have a color and an area occupying 50% is transparently displayed. In the fourth state 704, the electronic device 101 may display a first GUI 511-4 in which an area occupying 80% of the GUI indicating the shape of the digital pen 201 is displayed to have a color and an area occupying 20% is transparently displayed. In the fifth state 705, the electronic device 101 may display a first GUI 511-5 in which an area occupying 100% of the GUI indicating the shape of the digital pen 201 is displayed to have a color.

According to an embodiment, the information about the battery state may indicate the first state 701 to the fifth state 705 by using bit information. For another example, the information about the battery state may indicate a total capacity (in units of milliampere hour (mAh)) of a battery of the digital pen 201 and a remaining quantity of the battery by using bit information.

Figure 8:
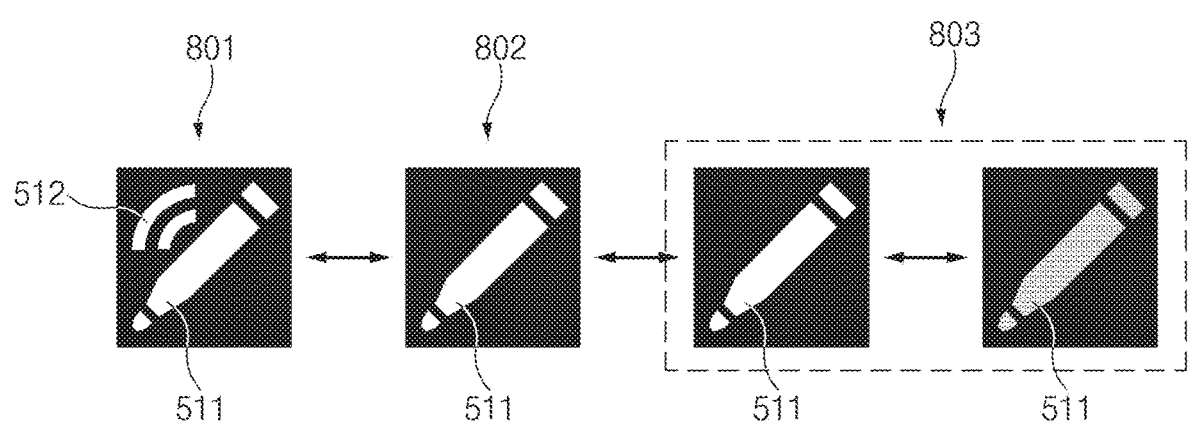
FIG. 8 illustrates a GUI displayed while a wireless communication link with a digital pen is established, according to various embodiments of the disclosure.

FIG. 8 illustrates a GUI (e.g., 511 or 512) displayed while the wireless communication link 520 with the digital pen 201 is established, according to various embodiments of the disclosure.

Referring to FIG. 8, the electronic device 101 may measure a status of the wireless communication link 520 in a state where the wireless communication link 520 with the digital pen 201 is established (e.g., in a first state 801). For example, the electronic device 101 may measure the status of the wireless communication link 520 by measuring the intensity (or the degree of interference) of a signal received from the digital pen 201. According to an embodiment, during the first state 801, the electronic device 101 may display the first GUI 511 indicating a battery state of the digital pen 201 and the second GUI 512 indicating the status of the wireless communication link 520 through the display 160.

According to an embodiment, the electronic device 101 may detect that the wireless communication link 520 is released, based on the measured status of the wireless communication link 520 or user settings. In a state where the wireless communication link 520 is released (e.g., in a second state 802), the electronic device 101 may provide the effect that the second GUI 512 is disappearing. In other words, the electronic device 101 may not display the second GUI 512 and may display only the first GUI 511.

According to an embodiment, the electronic device 101 may attempt to re-establish the wireless communication link 520. For example, the electronic device 101 may display a screen indicating that the wireless communication link 520 is released, through the display 160 and may perform the re-establishment in response to a user input selecting the re-establishment of the wireless communication link 520. For another example, the electronic device 101 may perform the re-establishment of the wireless communication link 520 automatically without a user input. In a state where the electronic device 101 re-establishes the wireless communication link 520 with the digital pen 201 (e.g., in a third state 803), the electronic device 101 may provide the effect that the first GUI 511 is flickering.

Figure 9:
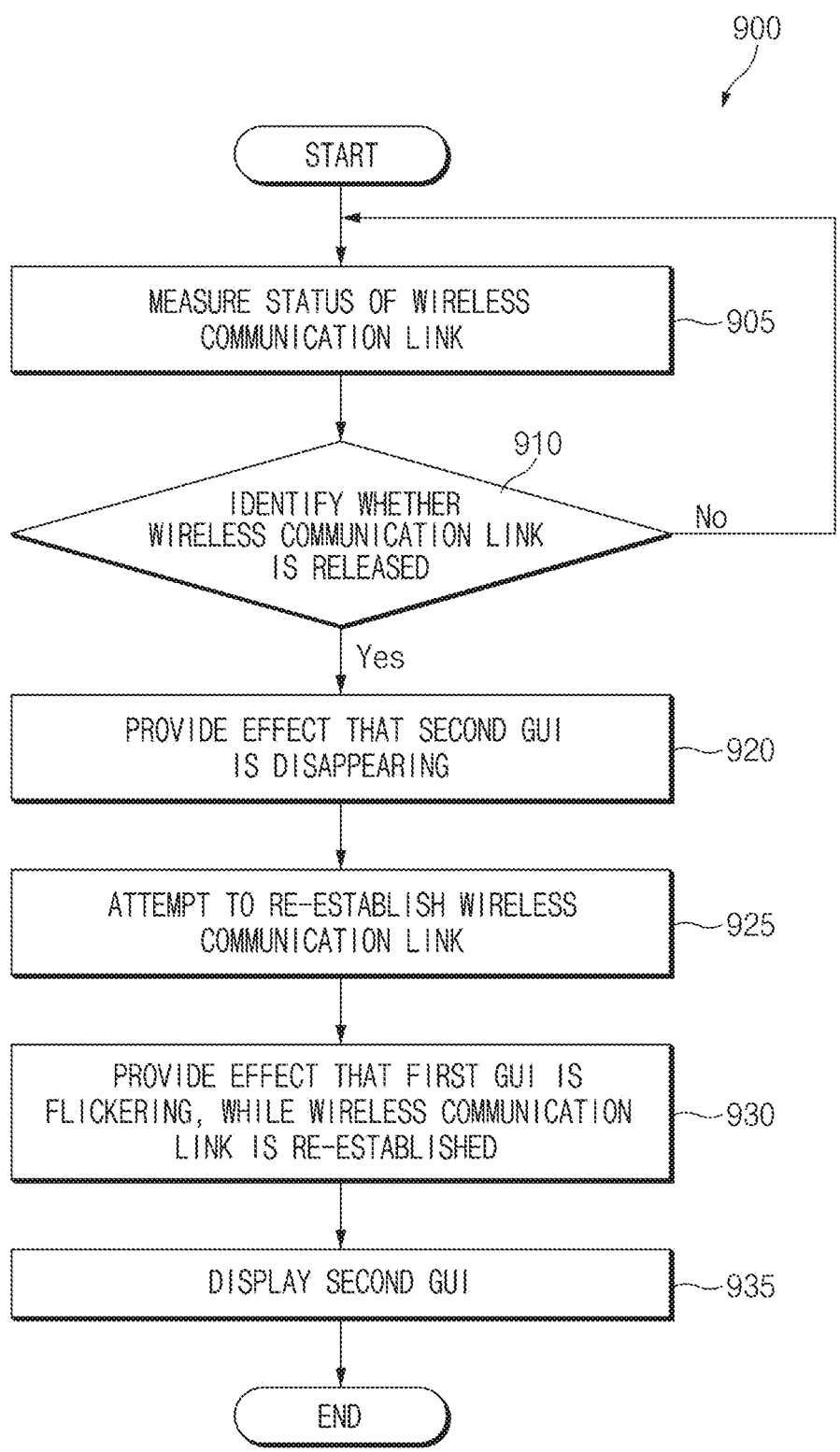
FIG. 9 illustrates an operation flowchart of an electronic device establishing a wireless communication link with a digital pen, according to various embodiments of the disclosure.

FIG. 9 illustrates an operation flowchart 900 of the electronic device 101 establishing the wireless communication link 520 with the digital pen 201, according to various embodiments of the disclosure.

Referring to FIG. 9, in operation 905 of the flowchart 900, the electronic device 101 may measure a status of the wireless communication link 520. According to an embodiment, the electronic device 101 may perform operation 905 between operation 605 and operation 625 of FIG. 6.

In operation 910, the electronic device 101 may identify whether the wireless communication link 520 is released, based on a result of the measurement. For example, when the intensity of a signal received from the digital pen 201 is smaller than a specified threshold value, the electronic device 101 may determine that the wireless communication link 520 is released. When the wireless communication link 520 is not released, the electronic device 101 may repeatedly perform operation 905 and operation 910.

When the wireless communication link 520 is released, in operation 920, the electronic device 101 may provide the effect that the second GUI 512 is disappearing. The electronic device 101 may display only the first GUI 511 on a partial area (e.g., the indicator bar 505) of the display 160.

In operation 925, the electronic device 101 may attempt to re-establish the wireless communication link 520. In operation 930, the electronic device 101 may provide the effect that the first GUI 511 is flickering, while the wireless communication link 520 is re-established. According to an embodiment, operation 925 and operation 930 may be performed substantially at the same time.

When the wireless communication link 520 is established, in operation 935, the electronic device 101 may display the second GUI 512 indicating the connected state of the wireless communication link 520. According to an embodiment, the electronic device 101 may display the second GUI 512 on a partial area (e.g., the indicator bar 505) of the display 160.

Figure 10:
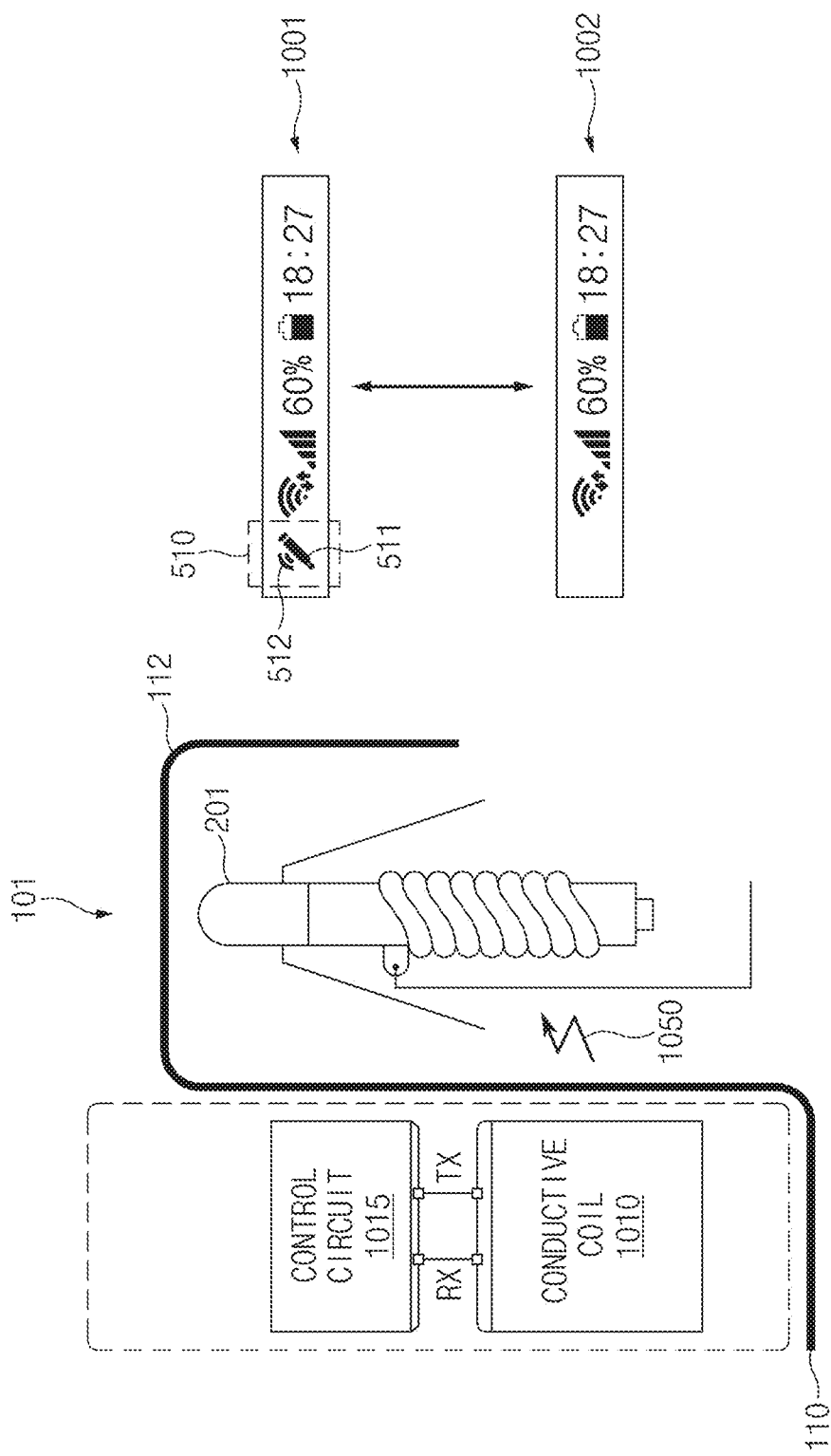
FIG. 10 illustrates an operation of displaying information about a digital pen based on whether a digital pen is detached, according to various embodiments of the disclosure.

FIG. 10 illustrates an operation of displaying information about the digital pen 201 based on whether the digital pen 201 is detached, according to various embodiments of the disclosure.

Referring to FIG. 10, the electronic device 101 may further include a conductive coil 1010 and a control circuit 1015 for the purpose of detecting the digital pen 201 inserted into the receiving space 112.

According to an embodiment, the conductive coil 1010 may perform an antenna function of transmitting/receiving a signal that is based on the electromagnetic induction manner (e.g., EMR, AES, or ECR). The conductive coil 1010 may be disposed within the housing 110 or within the receiving space 112.

According to an embodiment, the control circuit 1015 may generate a signal that is based on the electromagnetic induction manner or may process (or analyze) a received signal. According to an embodiment, the control circuit 1015 may be at least a part of the processor 120 (or an auxiliary processor 123) of FIG. 1 or may be a separate module (or chip).

According to an embodiment, the electronic device 101 may detect whether the digital pen 201 is detached, through a signal 1050 that is based on the electromagnetic induction manner. For example, the electronic device 101 may generate a signal of a specified frequency through the control circuit 1015 and may transmit the generated signal through the conductive coil 1010. The signal that is transmitted to the digital pen 201 may be induced by a resonant circuit (e.g., the resonant circuit 287 of FIG. 3) of the digital pen 201. The electronic device 101 may receive the signal induced through the conductive coil 1010. The electronic device 101 may identify whether the digital pen 201 is inserted into or detached from the receiving space 112, by analyzing (or processing) the signal induced through the control circuit 1015.

According to an embodiment, the electronic device 101 may establish the wireless communication link 520 with the digital pen 201 in a state where the digital pen 201 is inserted into the receiving space 112. For example, the electronic device 101 may establish the wireless communication link 520 based on the Bluetooth standard or the BLE standard.

According to an embodiment, the electronic device 101 may display the GUI 510 including at least one of the first GUI 511 or the second GUI 512, based on whether the digital pen 201 is detached. For example, when the electronic device 101 detects that the digital pen 201 is detached (e.g., a first state 1001), the electronic device 101 may display the GUI 510 through the display 160. For another example, when the electronic device 101 detects that the digital pen 201 is inserted (e.g., a second state 1002), the electronic device 101 may not display the GUI 510 on the display 160.

Figure 11:
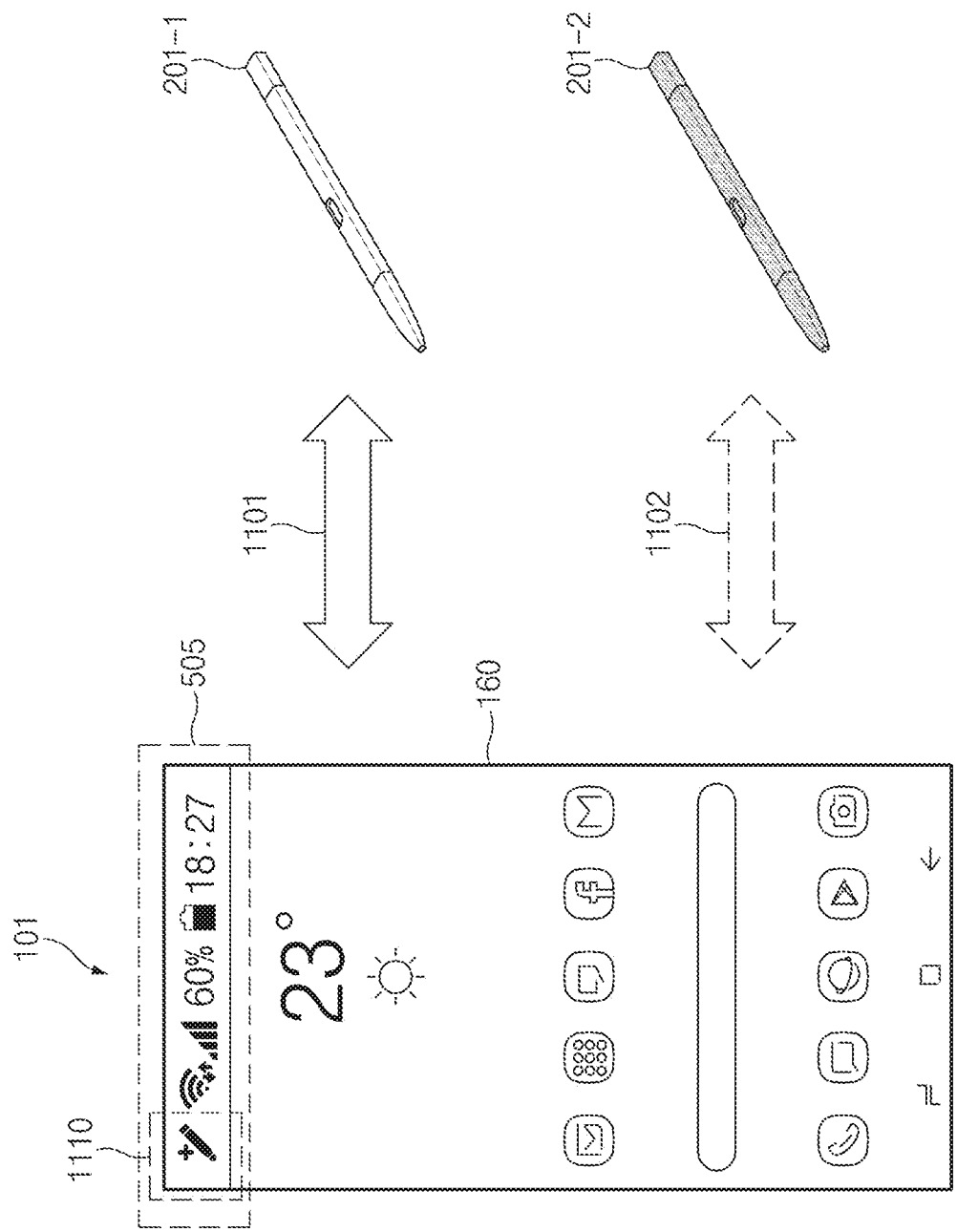
FIG. 11 illustrates an operation of displaying information about a plurality of digital pens according to various embodiments of the disclosure.

FIG. 11 illustrates an operation of displaying information about a plurality of digital pens (e.g., 201-1 and 201-2) according to various embodiments of the disclosure.

Referring to FIG. 11, the electronic device 101 may establish a wireless communication link with a plurality of digital pens (e.g., 201-1 and 201-2) based on the short-range wireless communication protocol (e.g., the Bluetooth standard or the BLE standard). According to an embodiment, the exterior (e.g., at least one of the housing 300, the first end portion 300a, or the second end portion 300b) of each of the plurality of digital pens (e.g., 201-1 and 201-2) may have a different color. For example, in the embodiment to be described below, a first digital pen 201-1 may have the exterior of a blue color, and a second digital pen 201-2 may have the exterior of a red color. However, kinds of colors are not limited thereto.

According to an embodiment, in the case where the electronic device 101 has a history in which a wireless communication link with at least two or more digital pens (e.g., 201-1 and 201-2) is established, the electronic device 101 may display a third GUI 1110 indicating that there is a history in which the wireless communication link with the plurality of digital pens 201-1 and 201-2 is established, through the display 160. According to an embodiment, the electronic device 101 may display the third GUI 1110 on a partial area (e.g., a partial area of the indicator bar 505) of the display 160.

According to an embodiment, to reduce unnecessary power consumption, the electronic device 101 may establish a wireless communication link (e.g., a first wireless communication link 1101) with one digital pen (e.g., the first digital pen 201-1) and may release a wireless communication link (e.g., a second wireless communication link 1102) with another digital pen (e.g., the second digital pen 201-2). In this case, the electronic device 101 may store history information about the second wireless communication link 1102 in a memory (e.g., the memory 130 of FIG. 1). The history information may include, for example, at least one of identification information of the second digital pen 201-2 or color information of the second digital pen 201-2.

Figure 12:
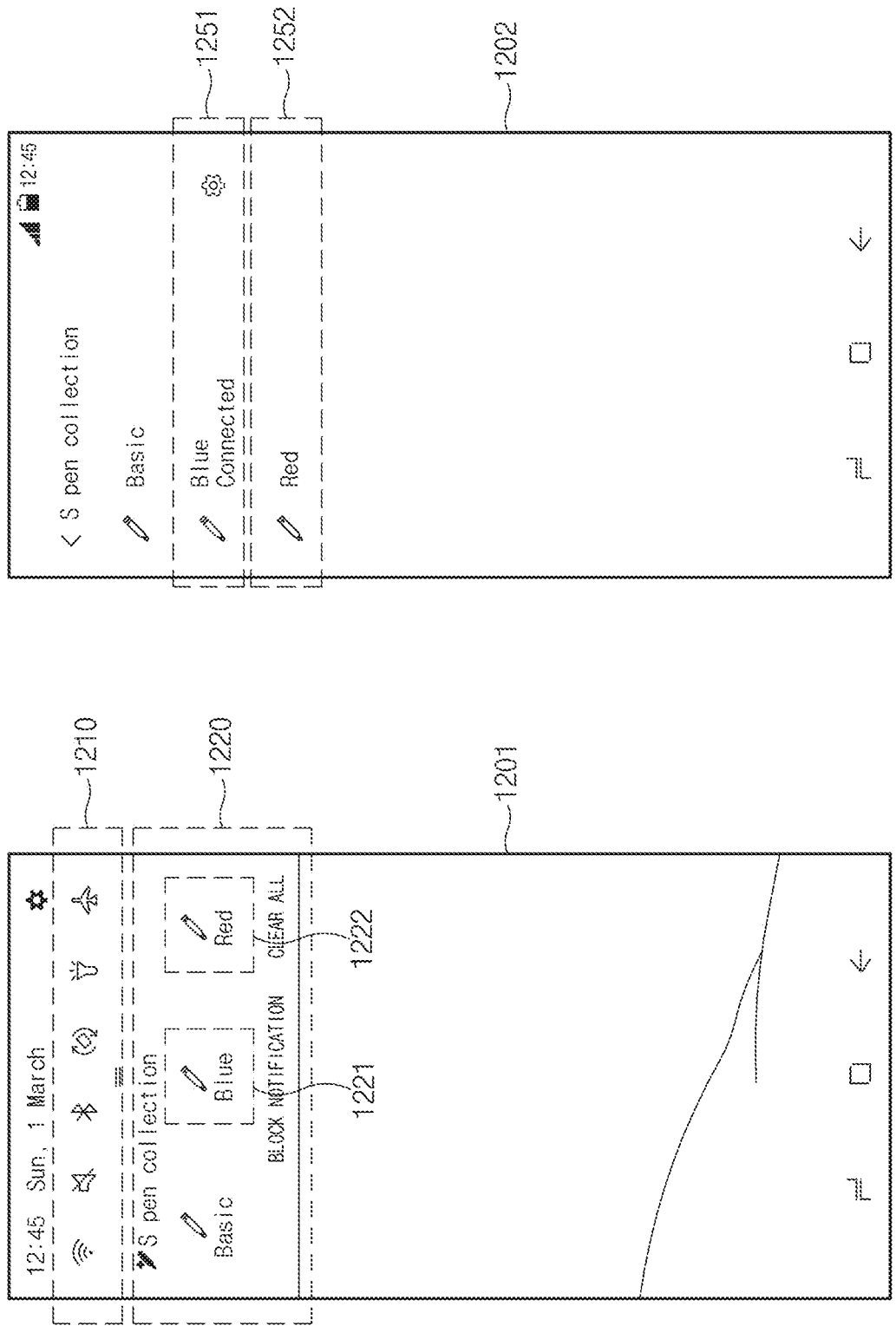
FIG. 12 illustrates a user interface (UI) selecting one digital pen among a plurality of digital pens according to various embodiments of the disclosure.

FIG. 12 illustrates a user interface (UI) selecting one digital pen 201-1 among the plurality of digital pens 201-1 and 201-2 according to various embodiments of the disclosure.

Referring to FIG. 12, the electronic device 101 may display an UI 1220 indicating one digital pen (e.g., the first digital pen 201-1 of FIG. 11), in which a wireless communication link (e.g., the first wireless communication link 1101 of FIG. 11) with the electronic device 101 is established, from among the plurality of digital pens 201-1 and 201-2. According to an embodiment, the electronic device 101 may display the UI 1220 on a first screen 1201. The first screen 1201 may include, for example, one of a home screen or an execution screen of an application program being executed by the electronic device 101. As another example, the first screen 1201 may include a lock screen.

According to an embodiment, the electronic device 101 may display the UI 1220 below a control window 1210 such that the user quickly selects one digital pen among a plurality of digital pens. The control window 1210 may be displayed depending on a swipe input that is received in a specified direction (e.g., a downward direction) from one area (e.g., an upper end) of the display 160. According to an embodiment, the control window 1210 may be referred to as a "quick panel". The UI 1220 may be displayed together with the control window 1210 in response to the user's swipe input calling the control window 1210.

According to an embodiment, the UI 1220 may include a first icon 1221 indicating the first digital pen 201-1 and a second icon 1222 indicating the second digital pen 201-2. According to an embodiment, a color of the first icon 1221 may be the same as a color (e.g., a blue color) of the first digital pen 201-1, and a color of the second icon 1222 may be the same as a color (e.g., a red color) of the second digital pen 201-2. According to an embodiment, to indicate that the first wireless communication link 1101 is established between the first digital pen 201-1 and the electronic device 101, the electronic device 101 may display the first icon 1221 to be deep and may display the second icon 1222 to be transparent. According to an embodiment, when a user input selecting the second icon 1222 is received, the electronic device 101 may release the first wireless communication link 1101 and may establish the second wireless communication link 1102.

According to another embodiment, although not illustrated in FIG. 12, the UI 1220 may be displayed in a partial area of the control window 1210. In this case, the electronic device 101 may display both the first icon 1221 and the second icon 1222 and may display an icon (e.g., the first icon 1221) of a digital pen connected with the electronic device 101 in a partial area of the control window 1210.

According to an embodiment, the electronic device 101 may present a digital pen connected with the electronic device 101 from among the first digital pen 201-1 and the second digital pen 201-2 on a setting screen 1202. For example, when the first digital pen 201-1 is connected with the electronic device 101, the electronic device 101 may display a text (e.g., "connected") on a first button 1251 indicating the first digital pen 201-1. According to an embodiment, when a user input selecting a second button 1252 indicating the second digital pen 201-2 is received, the electronic device 101 may release the first wireless communication link 1101 and may establish the second wireless communication link 1102.

Figure 13:
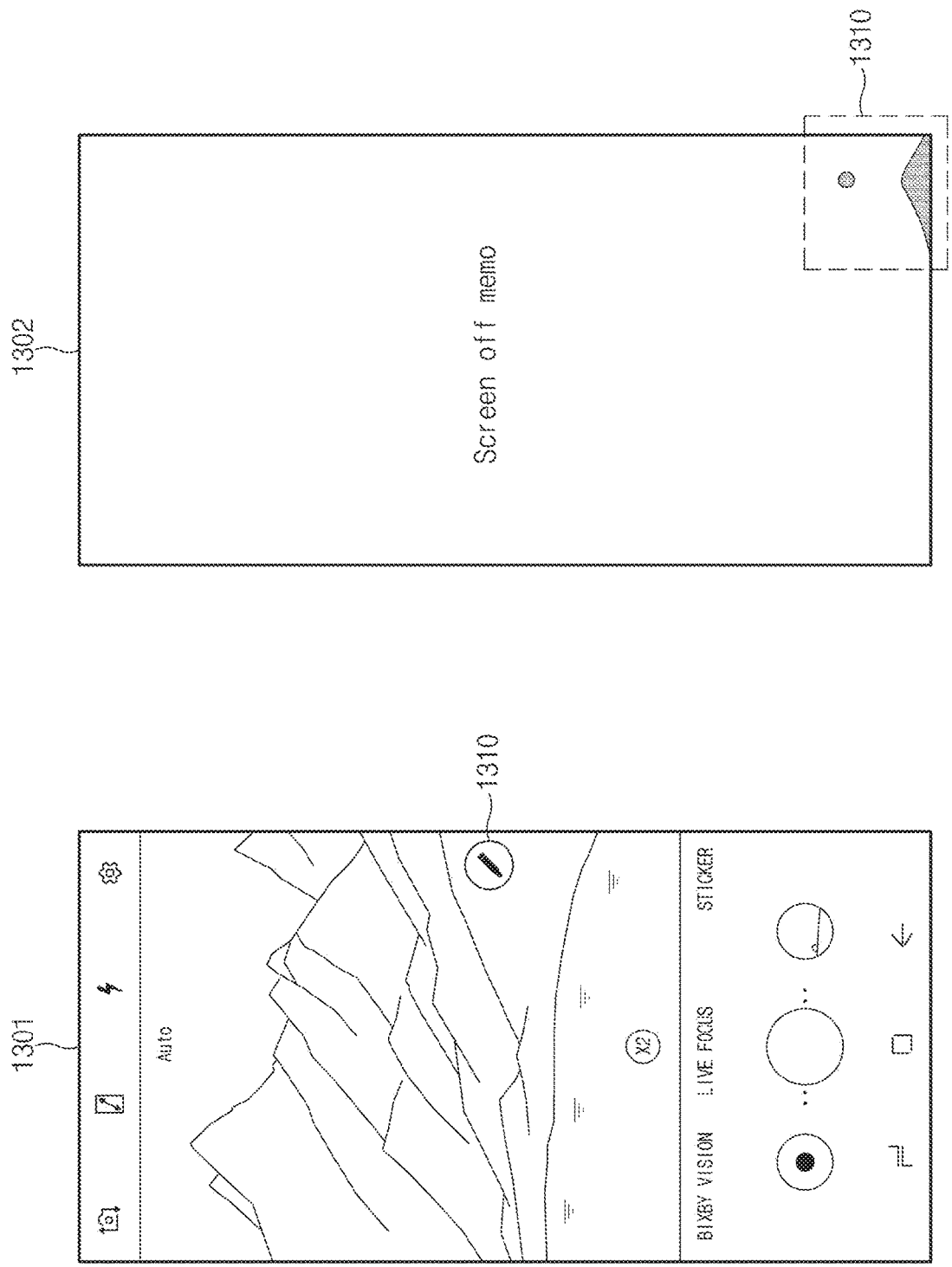
FIG. 13 illustrates an operation of displaying information about one digital pen selected from a plurality of digital pens according to various embodiments of the disclosure.

FIG. 13 illustrates an operation of displaying information about one digital pen (e.g., the first digital pen 201-1) selected from a plurality of digital pens (e.g., 201-1 and 201-2) according to various embodiments of the disclosure.

Referring to FIG. 13, the electronic device 101 may display a GUI 1310 indicating a digital pen (e.g., the first digital pen 201-1 of FIG. 11) connected with the electronic device 101 while a first screen 1301 (e.g., the first screen 1201 of FIG. 12) is output. According to an embodiment, the electronic device 101 may display the GUI 1310 in a partial area (e.g., on one side) of the first screen 1201.

According to an embodiment, a color of the GUI 1310 may be the same as a color of a digital pen connected with the electronic device 101. For example, when the electronic device 101 establishes the first wireless communication link 1101 with the first digital pen 201-1, the electronic device 101 may display the GUI 1310 having the same color as a color (e.g., a blue color) of the first digital pen 201-1. According to an embodiment, the electronic device 101 may receive information about the color of the first digital pen 201 from the first digital pen 201-1 through the first wireless communication link 1101. For another example, when the electronic device 101 establishes the second wireless communication link 1102 with the second digital pen 201-2, the electronic device 101 may display the GUI 1310 having the same color as a color (e.g., a red color) of the second digital pen 201-2.

According to an embodiment, the electronic device 101 may display the GUI 1310 in a state (e.g., 1302) where a screen off memo function is activated. According to an embodiment, the screen off memo function may mean a state where some components (e.g., a digitizer or the control circuit 1015 of FIG. 10) of the electronic device 101, which are necessary to receive an input of the digital pen 201, are activated and some components of the display 160, which are necessary to output a screen, are deactivated. When the screen off memo function is activated, a screen may not be output, or a black background screen may be output; however, the electronic device 101 may receive an input of the digital pen 201 through a digitizer.

According to an embodiment, the electronic device 101 may display the GUI 1310 in a partial area of the display 160. For example, the electronic device 101 may display the GUI 1310 on a partial area of the display 160, which corresponds to a location (e.g., the lower left of the electronic device 101) of a hole (e.g., the hole 111 of FIG. 2) for inserting the digital pen 201.

As described above, an electronic device (e.g., the electronic device 101 of FIG. 1) may include a housing (e.g., the housing 110 of FIG. 2), a display (e.g., at least a part of the display device 160) that is viewable through a portion of the housing, a wireless communication circuit (e.g., at least a part of the wireless communication module 192 of FIG. 1) that is disposed within the housing, a processor (e.g., the processor 120 of FIG. 1) that is disposed within the housing and is operatively connected with the display and the wireless communication circuit, and a memory (e.g., the memory 130 of FIG. 1) that is disposed within the housing and is operatively connected with the processor. The memory may store instructions that, when executed, cause the processor to establish a wireless communication link, which is based on a short-range wireless communication protocol, with a stylus pen inserted into an inner space of the housing, through the wireless communication circuit, to receive a signal including information about a battery state of the stylus pen from the stylus pen, through the wireless communication circuit and the short-range wireless communication protocol, to detect that the stylus pen is detached from the housing, and to display a first graphical user interface (GUI) (e.g., the first GUI 511 of FIG. 1) indicating the battery state through the display, based at least on the information about the battery state.

According to an embodiment, the short-range wireless communication protocol may be based on a Bluetooth standard or a Bluetooth low energy (BLE) standard defined by a Bluetooth special interest group (SIG).

According to an embodiment, the instructions may cause the processor to control the first GUI, based at least on at least a portion of the information about the battery state, such the first GUI indicates the battery state for each level through the display.

According to an embodiment, the instructions cause the processor to measure a status of the wireless communication link thus established and to display a second GUI (e.g., the second GUI 512 of FIG. 5) indicating the measured status of the wireless communication link through the display.

According to an embodiment, the instructions cause the processor to detect that the wireless communication link is released, to provide an effect that the second GUI is disappearing, through the display, to re-establish the wireless communication link, through the wireless communication circuit, to provide an effect that the first GUI is flickering, through the display, while the wireless communication link is re-established, and to provide the second GUI through the display when the wireless communication link is re-established.

According to an embodiment, the instructions cause the processor to detect that the stylus pen is inserted into an inner space of the housing, and to release a display of the first GUI and the second GUI through the display in response to detecting the insertion.

According to an embodiment, the instructions cause the processor to receive a signal including information about a color of the stylus pen from the stylus pen, through the wireless communication circuit and the short-range wireless communication protocol, and to display a third GUI (e.g., the third GUI 1310 of FIG. 13) having the color of the stylus pen through the display, based at least on the information about the color.

According to an embodiment, the instructions cause the processor to display the third GUI in a state where a screen of the display is turned off.

As described above, a method of an electronic device (e.g., the electronic device 101 of FIG. 1) may include establishing a wireless communication link, which is based on a short-range wireless communication protocol, with a stylus pen (e.g., the digital pen 201 of FIG. 2) inserted into an inner space of the electronic device, receiving a signal including information about a battery state of the stylus pen from the stylus pen, through the short-range wireless communication protocol, detecting that the stylus pen is detached from a housing of the electronic device, and displaying a first GUI (e.g., the first GUI 511 of FIG. 5) indicating the battery state, based at least on the information about the battery state.

According to an embodiment, the displaying of the first GUI may include controlling the first GUI, based at least on at least a portion of the information about the battery state, such the first GUI indicates the battery state for each level.

According to an embodiment, the method may further include measuring a status of the wireless communication link thus established, and displaying a second GUI (e.g., the second GUI 512 of FIG. 5) indicating the measured status of the wireless communication link.

According to an embodiment, the method may further include detecting that the wireless communication link is released, providing an effect that the second GUI is disappearing, re-establishing the wireless communication link, providing an effect that the first GUI is flickering, while the wireless communication link is re-established, and displaying the second GUI when the wireless communication link is re-established.

According to an embodiment, the method may further include detecting that the stylus pen is inserted into the inner space of the electronic device, and releasing a display of the first GUI and the second GUI in response to detecting the insertion.

According to an embodiment, the method may further include receiving a signal including information about a color of the stylus pen from the stylus pen, through the short-range wireless communication protocol, and displaying a third GUI (e.g., the third GUI 1310 of FIG. 13) having the color of the stylus pen, based at least on the information about the color.

According to an embodiment, the displaying of the third GUI may include displaying the third GUI in a state where a screen of a display of the electronic device is turned off.

As described above, an electronic device (e.g., the electronic device 101 of FIG. 1) may include a housing (e.g., the housing 110 of FIG. 2), a display (e.g., at least a part of the display device 160) that is viewable through a portion of the housing, a wireless communication circuit (e.g., at least a part of the wireless communication module 192 of FIG. 1) that is disposed within the housing, a stylus pen (e.g., the digital pen 201 of FIG. 2) that is insertable into an inner space of the housing, a processor (e.g., the processor 120 of FIG. 1) that is disposed within the housing and is operatively connected with the display and the wireless communication circuit, and a memory (e.g., the memory 130 of FIG. 1) that is disposed within the housing and is operatively connected with the processor. The memory may store instructions that, when executed, cause the processor to establish a wireless communication link, which is based on a short-range wireless communication protocol, with the stylus pen inserted into the inner space of the housing, through the wireless communication circuit, to detect that the stylus pen is detached from the housing, to receive a signal including information about a battery state of the stylus pen from the stylus pen, through the wireless communication circuit and the short-range wireless communication protocol, and to display a first graphical user interface (GUI) (e.g., the first GUI 511 of FIG. 5) indicating the battery state through the display, based at least on the information about the battery state.

According to an embodiment, the instructions may cause the processor to measure a status of the wireless communication link thus established, and to display a second GUI (e.g., the second GUI 512 of FIG. 5) indicating the measured status of the wireless communication link through the display.

According to an embodiment, the instructions may cause the processor to detect that the wireless communication link is released, to provide an effect that the second GUI is disappearing, through the display, to re-establish the wireless communication link, through the wireless communication circuit, to provide an effect that the first GUI is flickering, through the display, while the wireless communication link is re-established, and to provide the second GUI through the display, when the wireless communication link is re-established.

According to an embodiment, the instructions may cause the processor to detect that the stylus pen is inserted into an inner space of the housing, and to release a display of the first GUI and the second GUI through the display, in response to detecting the insertion.

According to an embodiment, the instructions may cause the processor to receive a signal including information about a color of the stylus pen from the stylus pen, through the wireless communication circuit and the short-range wireless communication protocol, and to display a third GUI (e.g., the third GUI 1310 of FIG. 13) having the color of the stylus pen through the display, based at least on the information about the color.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device may provide a user with information about a stylus pen, and thus preventing reduction in performance of a battery state or a wireless communication link status of a stylus pen.

According to various embodiments of the disclosure, the electronic device may display information about a stylus pen connected with the electronic device from among a plurality of stylus pens, and thus preventing a user from performing an abnormal operation by using a different stylus pen from the connected stylus pen.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a display viewable through a portion of the housing;
a wireless communication circuit disposed within the housing;
at least one processor disposed within the housing and operatively connected with the display and the wireless communication circuit; and
a memory disposed within the housing and operatively connected with the at least one processor,
wherein the memory stores instructions that, when executed, configure the at least one processor to:
establish a wireless communication link, which is based on a short-range wireless communication protocol, with a stylus pen inserted into an inner space of the housing, through the wireless communication circuit,
receive a signal including information about a battery state of the stylus pen from the stylus pen, through the wireless communication circuit and the short-range wireless communication protocol,
measure a status of the established wireless communication link,
detect that the stylus pen is detached from the housing,
display a graphical user interface (GUI) including a first GUI indicating the battery state and a second GUI indicating the status of the wireless communication link through the display, based at least on the information about the battery state and the measured status of the wireless communication link, and
release a display of the first GUI and the second GUI through the display in response to detecting that the stylus pen is inserted into the inner space of the housing.

2. The electronic device of claim 1, wherein the short-range wireless communication protocol is based on a Bluetooth (BT) standard or a Bluetooth low energy (BLE) standard defined by a Bluetooth special interest group (SIG).

3. The electronic device of claim 1, wherein the instructions, when executed, further configure the at least one processor to:
control the first GUI, based at least on at least a portion of the information about the battery state, such the first GUI indicates the battery state for each level through the display.

4. The electronic device of claim 1, wherein the instructions, when executed, further configure the at least one processor to:
detect that the wireless communication link is released;

provide an effect that the second GUI is disappearing, through the display;
re-establish the wireless communication link, through the wireless communication circuit;
provide an effect that the first GUI is flickering, through the display, while the wireless communication link is re-established; and
provide the second GUI through the display when the wireless communication link is re-established.

5. The electronic device of claim 1, wherein the instructions, when executed, further configure the at least one processor to:
receive a signal including information about a color of the stylus pen from the stylus pen, through the wireless communication circuit and the short-range wireless communication protocol; and
display a third GUI having the color of the stylus pen through the display, based at least on the information about the color.

6. The electronic device of claim 5, wherein the instructions, when executed, further configure the at least one processor to:
display the third GUI in a state where a screen of the display is turned off.

7. A method of an electronic device, the method comprising:
establishing a wireless communication link, which is based on a short-range wireless communication protocol, with a stylus pen inserted into an inner space of the electronic device;
receiving a signal including information about a battery state of the stylus pen from the stylus pen, through the short-range wireless communication protocol;
measuring a status of the established wireless communication link;
detecting that the stylus pen is detached from a housing of the electronic device;
displaying a graphical user interface (GUI) including a first GUI indicating the battery state and a second GUI indicating the status of the wireless communication link, based at least on the information about the battery state and the measured status of the wireless communication link; and
releasing a display of the first GUI and the second GUI in response to detecting that the stylus pen is inserted into the inner space of the electronic device.

8. The method of claim 7, wherein the displaying of the first GUI includes:
controlling the first GUI, based at least on at least a portion of the information about the battery state, such the first GUI indicates the battery state for each level.

9. The method of claim 7, further comprising:
detecting that the wireless communication link is released;
providing an effect that the second GUI is disappearing;
re-establishing the wireless communication link;
providing an effect that the first GUI is flickering, while the wireless communication link is re-established; and
displaying the second GUI when the wireless communication link is re-established.

10. The method of claim 7, further comprising:
receiving a signal including information about a color of the stylus pen from the stylus pen, through the short-range wireless communication protocol; and
displaying a third GUI having the color of the stylus pen, based at least on the information about the color.

11. The method of claim 10, wherein the displaying of the third GUI includes:
displaying the third GUI in a state where a screen of a display of the electronic device is turned off.

12. An electronic device comprising:
a housing;
a display viewable through a portion of the housing;
a wireless communication circuit disposed within the housing;
a stylus pen insertable into an inner space of the housing;
at least one processor disposed within the housing and operatively connected with the display and the wireless communication circuit; and
a memory disposed within the housing and operatively connected with the at least one processor,
wherein the memory stores instructions that, when executed, configure the at least one processor to:
establish a wireless communication link, which is based on a short-range wireless communication protocol, with the stylus pen inserted into the inner space of the housing, through the wireless communication circuit,
detect that the stylus pen is detached from the housing,
receive a signal including information about a battery state of the stylus pen from the stylus pen, through the wireless communication circuit and the short-range wireless communication protocol,
measure a status of the established wireless communication link, display a graphical user interface (GUI) including a first GUI indicating the battery state and a second GUI indicating the status of the wireless communication link through the display, based at least on the information about the battery state and the measured status of the wireless communication link, and
release a display of the first GUI and the second GUI through the display, in response to detecting that the stylus pen is inserted into the inner space of the housing.

13. The electronic device of claim 12, wherein the instructions, when executed, further configure the at least one processor to:
detect that the wireless communication link is released;
provide an effect that the second GUI is disappearing, through the display;
re-establish the wireless communication link, through the wireless communication circuit;
provide an effect that the first GUI is flickering, through the display, while the wireless communication link is re-established; and
provide the second GUI through the display, when the wireless communication link is re-established.

14. The electronic device of claim 12, wherein the instructions, when executed, further configure the at least one processor to:
receive a signal including information about a color of the stylus pen from the stylus pen, through the wireless communication circuit and the short-range wireless communication protocol; and
display a third GUI having the color of the stylus pen through the display, based at least on the information about the color.

* * * * *